(12) United States Patent
Miyamura

(10) Patent No.: US 6,744,581 B2
(45) Date of Patent: Jun. 1, 2004

(54) METHOD FOR TESTING MAGNETIC TAPE DRIVE APPARATUS

(75) Inventor: Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 09/896,405

(22) Filed: Jun. 28, 2001

(65) Prior Publication Data

US 2002/0006004 A1 Jan. 17, 2002

(30) Foreign Application Priority Data

Jun. 28, 2000 (JP) ........................................ 2000-195034

(51) Int. Cl.⁷ .............................................. G11B 5/09
(52) U.S. Cl. ............................ 360/53; 360/48; 360/31; 360/71
(58) Field of Search .......................... 360/53, 31, 74.1, 360/71, 72.2, 48

(56) References Cited

U.S. PATENT DOCUMENTS

| | | | | |
|---|---|---|---|---|
| 5,023,548 A | * | 6/1991 | McMorran | 360/31 |
| 5,057,950 A | * | 10/1991 | Ozaki et al. | 360/72.2 |
| 5,491,590 A | * | 2/1996 | Endo et al. | 360/48 |
| 6,256,158 B1 | * | 7/2001 | Brown et al. | 360/31 |
| 6,282,039 B1 | * | 8/2001 | Bartlett | 360/48 |

* cited by examiner

*Primary Examiner*—Andrew L. Sniezek
*Assistant Examiner*—Rocio Colon
(74) *Attorney, Agent, or Firm*—Silicon Valley IP Group, PC; Dominic M. Kotab

(57) ABSTRACT

Each of data bands of a magnetic tape includes a plurality of wraps as data tracks. In the read/write test, a predetermined test length is set to every wrap and test patterns are written to the test length portion, and the patterns are read so as to verify whether or not there is trouble to the drive or the tape. While it takes time to switch a magnetic head among the wraps on testing all the wraps, the time depends on order of switching. In the present invention, the order in which the magnetic head switches the wraps for reading or writing, that is, a wrap sequence, is selected to be different from the wrap sequence in an actual active state. The wrap sequence in the actual active state has been selected based on a factor such as writing performance of the tape, which has not been suited to the read/write test.

7 Claims, 9 Drawing Sheets

| Data band distance | In the same data band | Adjacent band | | Third band | Fourth band |
|---|---|---|---|---|---|
| Wrap distance | – | 5 or less | 6 or more | – | – |
| Same direction | 1.79 sec. | 4.38 sec. | | 6.95 sec. | 9.53 sec. |
| Reverse direction | | 3.69 sec. | | 6.24 sec. | 8.84 sec. |

Figure 9

| No | P | W | | | | | | | | R | | | | | | | |
|----|---|---|---|---|---|---|---|---|---|---|---|---|---|---|---|---|---|
| 1  | 4 | 4 | 3 | 0 | 1 | 2 | 5 | 6 | 7 | 4 | 3 | 0 | 1 | 2 | 5 | 6 | 7 |
| 2  | 4 | 4 | 3 | 0 | 1 | 2 | 5 | 6 | 7 | 4 | 7 | 6 | 5 | 2 | 1 | 0 | 3 |
| 3  | 4 | 4 | 3 | 0 | 1 | 2 | 5 | 6 | 7 | 4 | 7 | 6 | 5 | 2 | 3 | 0 | 1 |
| 4  | 4 | 4 | 3 | 0 | 1 | 2 | 5 | 6 | 7 | 6 | 5 | 2 | 1 | 0 | 3 | 4 | 7 |
| 5  | 4 | 4 | 3 | 0 | 1 | 2 | 5 | 6 | 7 | 6 | 7 | 4 | 3 | 0 | 1 | 2 | 5 |
| 6  | 4 | 4 | 3 | 0 | 1 | 2 | 5 | 6 | 7 | 6 | 7 | 4 | 5 | 2 | 1 | 0 | 3 |
| 7  | 4 | 4 | 3 | 0 | 1 | 2 | 5 | 6 | 7 | 6 | 7 | 4 | 5 | 2 | 3 | 0 | 1 |
| 8  | 4 | 4 | 7 | 6 | 5 | 2 | 1 | 0 | 3 | 0 | 1 | 2 | 3 | 4 | 5 | 6 | 7 |
| 9  | 4 | 4 | 7 | 6 | 5 | 2 | 1 | 0 | 3 | 0 | 1 | 2 | 3 | 4 | 7 | 6 | 5 |
| 10 | 4 | 4 | 7 | 6 | 5 | 2 | 1 | 0 | 3 | 0 | 1 | 2 | 5 | 6 | 7 | 4 | 3 |
| 11 | 4 | 4 | 7 | 6 | 5 | 2 | 1 | 0 | 3 | 0 | 3 | 6 | 5 | 4 | 7 | 2 | 1 |
| 12 | 4 | 4 | 7 | 6 | 5 | 2 | 1 | 0 | 3 | 2 | 1 | 0 | 3 | 4 | 5 | 6 | 7 |
| 13 | 4 | 4 | 7 | 6 | 5 | 2 | 1 | 0 | 3 | 2 | 1 | 0 | 3 | 4 | 7 | 6 | 5 |
| 14 | 4 | 4 | 7 | 6 | 5 | 2 | 1 | 0 | 3 | 2 | 5 | 6 | 7 | 4 | 3 | 0 | 1 |
| 15 | 4 | 4 | 7 | 6 | 5 | 2 | 1 | 0 | 3 | 4 | 3 | 0 | 1 | 2 | 5 | 6 | 7 |
| 16 | 4 | 4 | 7 | 6 | 5 | 2 | 1 | 0 | 3 | 4 | 7 | 6 | 5 | 2 | 1 | 0 | 3 |
| 17 | 4 | 4 | 7 | 6 | 5 | 2 | 1 | 0 | 3 | 4 | 7 | 6 | 5 | 2 | 3 | 0 | 1 |
| 18 | 4 | 4 | 7 | 6 | 5 | 2 | 3 | 0 | 1 | 0 | 1 | 2 | 3 | 4 | 5 | 6 | 7 |
| 19 | 4 | 4 | 7 | 6 | 5 | 2 | 3 | 0 | 1 | 0 | 1 | 2 | 3 | 4 | 7 | 6 | 5 |
| 20 | 4 | 4 | 7 | 6 | 5 | 2 | 3 | 0 | 1 | 0 | 1 | 2 | 5 | 6 | 7 | 4 | 3 |
| 21 | 4 | 4 | 7 | 6 | 5 | 2 | 3 | 0 | 1 | 0 | 3 | 4 | 7 | 6 | 5 | 2 | 1 |
| 22 | 4 | 4 | 7 | 6 | 5 | 2 | 3 | 0 | 1 | 2 | 1 | 0 | 3 | 4 | 5 | 6 | 7 |
| 23 | 4 | 4 | 7 | 6 | 5 | 2 | 3 | 0 | 1 | 2 | 1 | 0 | 3 | 4 | 7 | 6 | 5 |
| 24 | 4 | 4 | 7 | 6 | 5 | 2 | 3 | 0 | 1 | 2 | 5 | 6 | 7 | 4 | 3 | 0 | 1 |

Figure 10

| No | Wrap group | Mode | Wrap sequence | | | | | |
|---|---|---|---|---|---|---|---|---|
| 1 | 4 | W | 0 | 2 | 4 | 6 | 8 | 10 |
| 2 | 7 | | 35 | 33 | 31 | 29 | 27 | 25 |
| 3 | 6 | | 34 | 32 | 30 | 28 | 26 | 24 |
| 4 | 5 | | 1 | 3 | 5 | 7 | 9 | 11 |
| 5 | 2 | | 16 | 22 | 20 | 18 | 14 | 12 |
| 6 | 3 | | 23 | 21 | 17 | 15 | 13 | 19 |
| 7 | 0 | | 46 | 44 | 42 | 40 | 38 | 36 |
| 8 | 1 | | 47 | 45 | 43 | 41 | 39 | 37 |
| 9 | 0 | R | 46 | 44 | 42 | 40 | 38 | 36 |
| 10 | 1 | | 47 | 45 | 43 | 41 | 39 | 37 |
| 11 | 2 | | 16 | 22 | 20 | 18 | 14 | 12 |
| 12 | 3 | | 23 | 21 | 17 | 15 | 13 | 19 |
| 13 | 4 | | 0 | 2 | 4 | 6 | 8 | 10 |
| 14 | 5 | | 1 | 3 | 5 | 7 | 9 | 11 |
| 15 | 6 | | 34 | 32 | 30 | 28 | 26 | 24 |
| 16 | 7 | | 35 | 33 | 31 | 29 | 27 | 25 |

METHOD FOR TESTING MAGNETIC TAPE DRIVE APPARATUS

FIELD OF THE INVENTION

The present invention relates to a technique for testing a magnetic tape drive, and more particularly, it relates to a technique for improving order of movement of a magnetic head to access all wraps in a read/write test on the magnetic tape drive so as to reduce test time.

BACKGROUND OF THE INVENTION

A magnetic tape drive is subjected to a read/write test, in which predetermined data is written to a magnetic tape upon completion of assembly or on occurrence of a fault during actual operation and the written data is then read to check performance. The magnetic tape has a plurality of data tracks defined as a recording area across it corresponding to a plurality of conversion elements of a magnetic head, which is called a wrap. In the read/write test, for all the wraps, test data (hereafter, referred to as a test pattern) is written on a test length portion equivalent to five percent or so of overall tape length while switching a magnetic head position and the written test pattern is further read.

This read/write test has an object of reading and writing a test pattern for all the wraps and verifying the read test pattern so as to check a function of reading and writing by correctly moving the magnetic head to all the wraps. In addition, it has an object of, on occurrence of trouble in the magnetic tape drive, limiting existence of a cause of the trouble such as whether the tape or the drive has a problem. For instance, in the case where trouble occurs in actual operation or normal operation and good results are acquired by conducting the read/write test on a different tape from the one used for the operation, it can be presumed that the tape used on occurrence of the trouble has a problem. Moreover, in the case where it passes the read/write test, it can be presumed that the tape has no problem and the drive has the cause.

Conventional magnetic tapes are relatively short in overall length and low in bit density, which means the number of wraps is small, so that a problem seldom occurs even if 5-percent test length is adopted. Therefore, the read/write test on each individual wrap has been conducted in order of moving the head in a normal operation of the drive, that is, according to a wrap sequence in the normal operation. A contributing factor to this is that it is easier to use a program of the wrap sequence to be used in the normal operation rather than to create a special sequence program for the test. However, while the conventional tapes have 30 GB or so of storage capacity, recent tapes are as long as 600 meters with the number of wraps twice as many as conventional tapes and increased storage capacity of 100 GB so that the read/write test conducted in the conventional wrap sequence requires test time of as long as 40 minutes.

Reduction of the test time is strongly required to address the trouble occurring in manufacturing processes of magnetic tape drives and in their active state, and attempts to implement it have been made so far, without sufficient results, by reducing the test length of the tapes by up to 0.5 percent of the overall test length or improving servo control systems.

SUMMARY OF THE INVENTION

The inventor noted when shortening the test length of the tapes that, as a factor responsible for the test time, the time required for the magnetic head to move among the wraps is important, which was not noteworthy when the test length of the tapes was long. It was also noted that, to achieve the object of the read/write test, the wrap sequence does not have to be the one in the normal operation as far as all the wraps can be read and written. Thus, an object of the present invention is to provide a method for conducting the read/write test on the magnetic tape drive in a short time. Another object of the present invention is to provide a magnetic tape drive capable of conducting the read/write test in a short time.

A principle of the present invention is to utilize the fact that time when switching a magnetic head from one wrap to another wrap is different depending on mutual physical relationship between the wraps before and after the switching in a read/write test on a magnetic tape drive so as to select order of switching wraps, namely, a wrap sequence that is optimum. Another principle is to select a wrap sequence suited to the read/write test by paying attention to a characteristic that changing to a write mode after a read mode requires time to write to a buffer.

An aspect of the present invention is to make the wrap sequence different from the one in a normal operation of the drive. While the order of switching wraps in the read/write test has been that in the normal operation conventionally, this order has been prescribed in specifications due to other elements such as data recording performance of the tape, not considering time for the read/write test.

While the time for switching wraps is not a problem as time for reading and writing in the actual active state of the magnetic tape drive since it moves on to a next wrap after writing in overall length of the tape for a certain wrap, it is significant to adopt the wrap sequence different from the one in the actual active state in the read/write test since the wrap sequence influences test time greatly because of short test length.

In another aspect of the present invention, order of data bands to be accessed by the magnetic head is set up first. Next, test patterns are consecutively written to all the wraps included in either a forward wrap group or a backward wrap group for each of the data bands selected in the set up order. As for the selected data bands, while it may move on to another data band after writing only to all the wraps included in the forward wrap group, or it may move on to another data band after writing only to all the wraps included in the backward wrap group, or, it may further write to all the wraps included in the forward wrap group and subsequently to all the wraps in the backward wrap group of the same data band, it consecutively writes to all the wraps included in either one of the wrap groups. Consecutively means that, while writing to the wrap group in a certain direction, the magnetic head does not move to another wrap group when it moves from one wrap to another wrap. However, order of writing to the wraps included in a certain wrap group can be arbitrarily selected.

Next, test patterns are read as to the wrap groups written according to the set up order of the data bands. Reading is also performed consecutively in a unit of the wrap group on the wraps included therein so as not to move to another wrap group while reading. It becomes unnecessary to change movement direction of the tape when switching wraps within the same band by writing or reading in the unit of wrap group in a certain direction, and the time for switching wraps can be reduced since it is conducted within the same data band. The read test patterns are verified by software or hardware. To be more specific, it is determined by whether the written test patterns are correctly read. It is possible to prepare a filter by hardware equivalent to the test patterns to verify whether the read test patterns can pass through it, or to compare the written test patterns to the read test patterns.

In a further aspect of the present invention, writing according to the above aspect is performed on all the wrap groups including the forward and backward groups and then reading is performed therefrom. As it takes extra time to write to a buffer if the modes of reading and writing the wrap groups are changed, writing is performed first on all the wrap groups, that is, all the wraps included in all the data bands and then reading is performed therefrom so that it is sufficient to write the test patterns to the buffer just once.

A still further aspect of the present invention relates to a magnetic tape drive having the above forms. A program recording a wrap sequence for testing is stored in a recorder such as a ROM as a program that is different from a wrap sequence in the normal operation, and is executed by a central processing unit (CPU) on the read/write test.

BRIEF DESCRIPTION OF DRAWINGS

FIG. 9 is a diagram showing the wrap group sequence wherein a total of time for switching wrap groups and time for writing to a buffer is the smallest; and FIG. 10 is a diagram showing the wrap sequences created based on selected wrap group sequences.

DETAILED DESCRIPTION OF THE PREFERRED EMBODIMENTS

Figure 1:
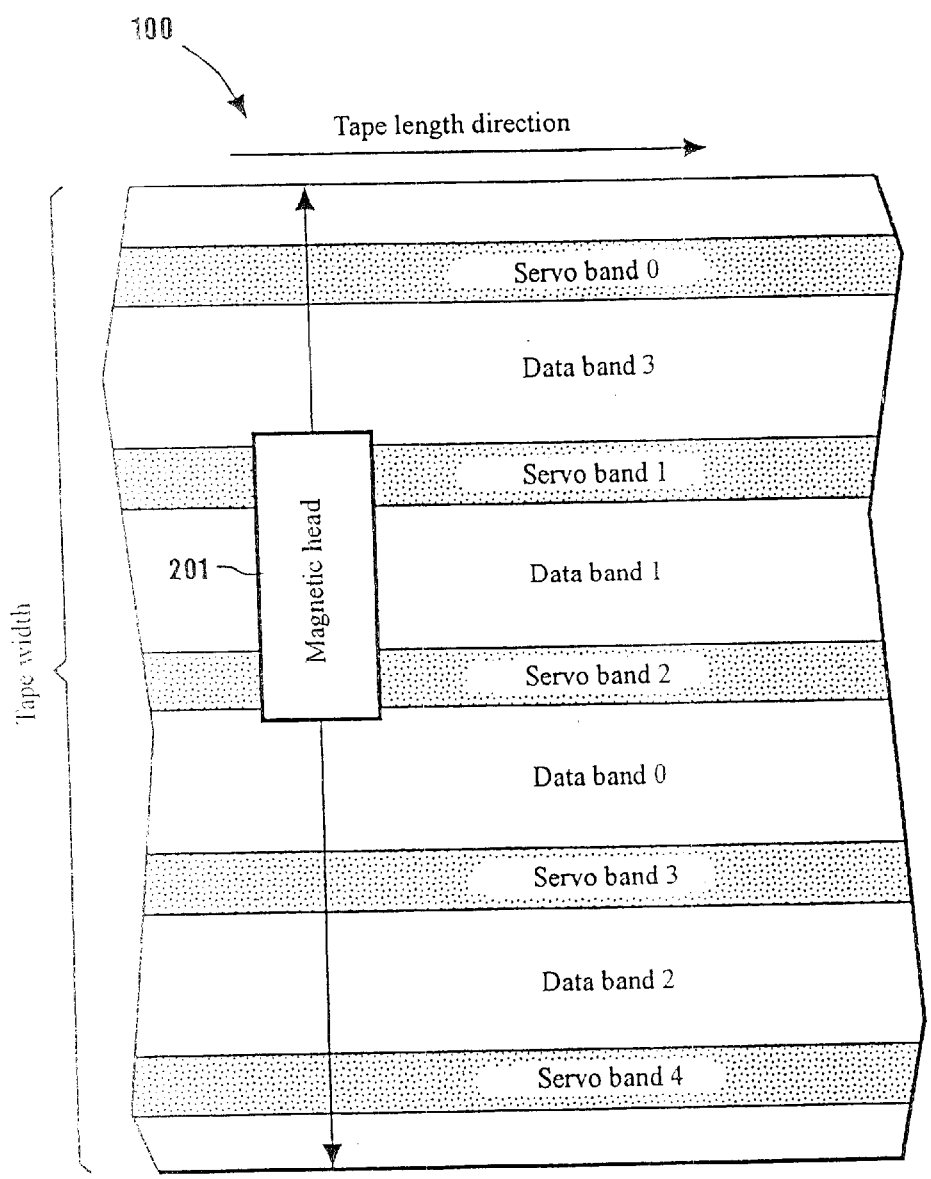
FIG. 1 is a diagram schematically showing configuration of a magnetic tape.

FIG. 1 is a diagram schematically showing configuration of a recording area of a magnetic tape 100 and a magnetic head 201 for writing and reading data. The magnetic tape 100 has four data bands from 0 to 3 allocated with five servo bands from 0 to 4 on both sides of each data band. The data bands are utilized as the recording area, and each servo band has information for detecting a position of the magnetic head in width and length directions of the tape 100 being written to. In addition, each data band has a plurality of wraps defined as data tracks, which will be described in detail later.

As shown in FIG. 1, the magnetic head 201 reads servo information of a servo band 1 and a servo band 2 as to data band 1 and moves slightly in the tape width direction to select a desired wrap (unillustrated). The magnetic head 201 further moves greatly in the tape width direction and reads servo information corresponding to another data band so as to access a desired wrap in the data band.

Figure 2:
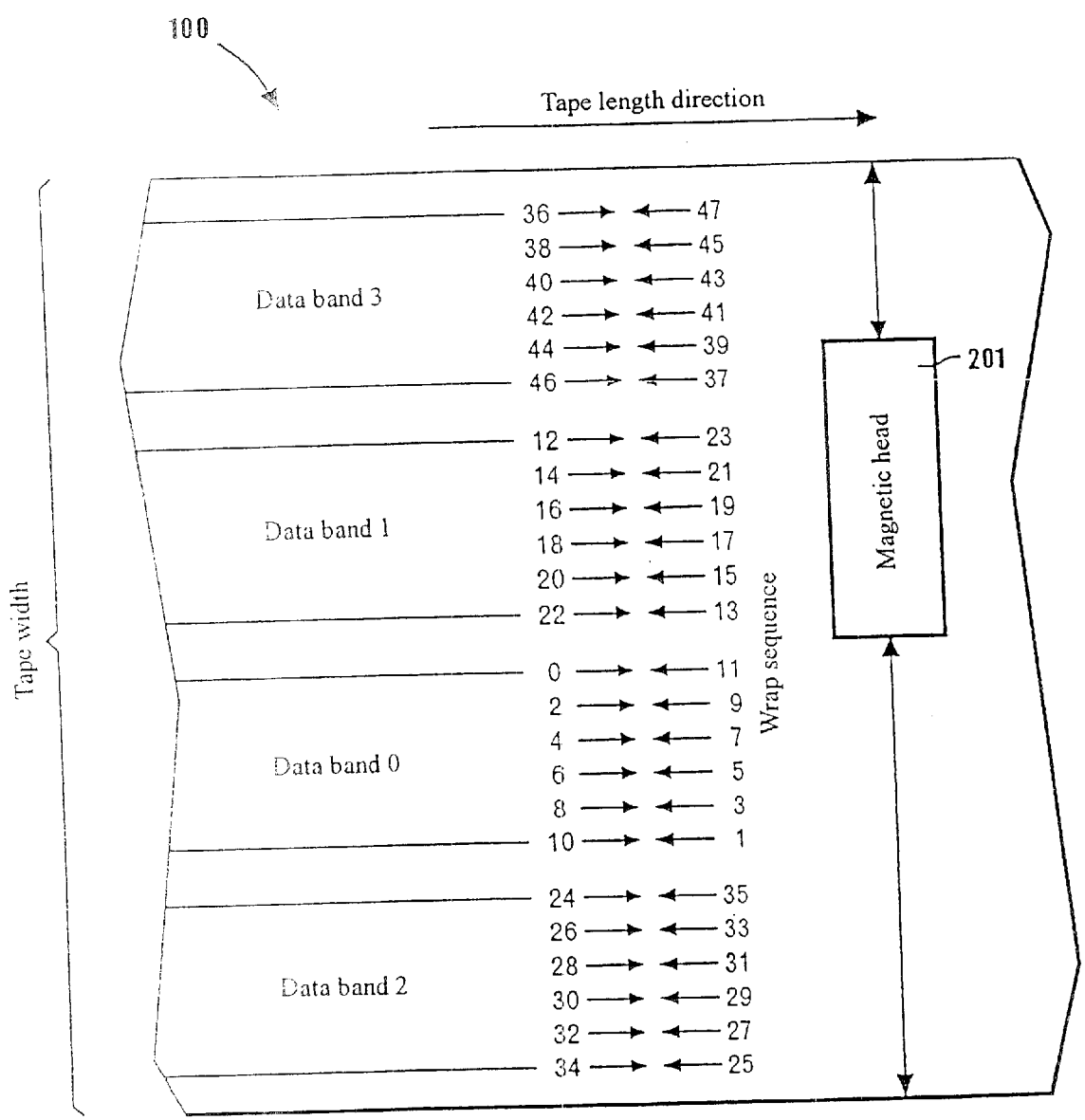
FIG. 2 is a diagram schematically showing configuration of wraps on data bands.

FIG. 2 is a diagram schematically showing configuration of wraps defined on data bands. Each of the data bands includes 12 wraps. FIG. 2 shows wrap sequences with 48 serial numbers from 0 to 47 and arrows. For instance, a data band 0 shows six pairs of two opposite arrows such as a wrap 0 and a wrap 11.

Here, it shows that a direction of the arrows corresponds to a tape movement direction, and each pair of wraps indicates that they are the wraps defined in the same magnetic head position in the tape width direction. To be more specific, the wrap 0 and the wrap 11 are the area where the magnetic head 201 can move the tape in the forward and backward directions to read data when it is in the same position in the tape width direction. To change from the wrap 0 to the wrap 2, the magnetic head 201 moves slightly based on servo information of the servo band 2 and the servo band 3.

The serial numbers shown as wrap sequences in FIG. 2 show order of the wraps for writing data to the magnetic tape 100 in a normal operation of a magnetic tape drive not but in a test operation. On loading a tape cartridge on the magnetic tape drive first, the magnetic head 201 moves to access the position of the wrap 0. If it writes data to the wrap 0 and reaches the end of the magnetic tape 100 while moving the tape in the forward direction, the magnetic tape moves in the backward direction and the magnetic head moves to the position of the wrap 1 in the tape width direction to continue writing.

The wrap sequences in the normal operation are prescribed by the specifications based on a technical finding that the closer to the edge of the tape in width direction, the less reliable the reading and writing are, and if the writing of data fails, it is more likely to succeed by rewriting at a distance further from the edge.

Figure 3:
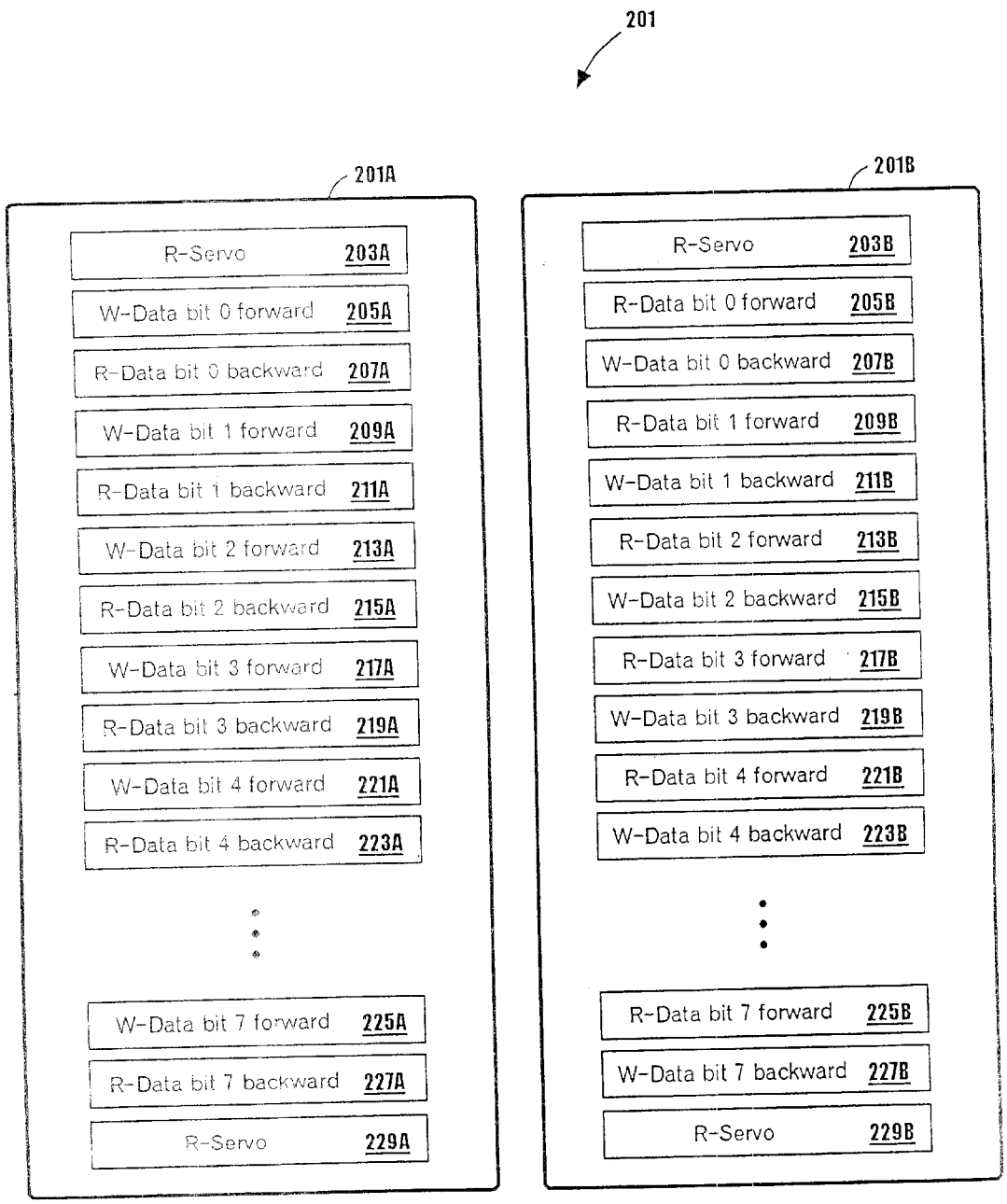
FIG. 3 is a diagram schematically showing configuration of a magnetic head 201 applied to an embodiment of the present invention.

FIG. 3 schematically shows configuration of the magnetic head 201 applied to an embodiment of the present invention. The magnetic head 201 has two heads of 201A and 201B arranged in a pair in the tape length direction, which are placed so that magnetic signals and electric signals can be converted to be read and written on the tape. The magnetic head 201 has conversion elements placed in order to access every bit of an arbitrary wrap included in a data band sandwiched by the servo bands on both sides. In this embodiment, the number of bits of each wrap is selected to be 8 bits. Conversion elements 203A, B and 229A, B are provided for reading only the servo information included in the servo bands.

Conversion elements 205, 209, 213 . . . 225 are the pairs only for use with the forward wraps, and conversion elements 207, 211, 215, . . . 227 are the pairs only for use with the backward wraps. The pairs only for use with the forward wraps include conversion elements 205A, 209A, 213A . . . 225A used for writing only and conversion elements 205B, 209B, 213B . . . 225B used for reading only corresponding to the total 8 bits from the 0-bit to 7-bit positions. The conversion elements for writing only convert the electric signals sent from a host computer or a CPU inside the drive into the magnetic signals and writes them to the magnetic tape, and the conversion elements for reading only convert information written to the magnetic tape as change of magnetism into the electric signals.

The pairs only for use with the backward wraps include conversion elements 207B, 211B, 215B . . . 227B used for writing only and conversion elements 207A, 211A, 215A . . . 227A used for reading only corresponding to the total 8 bits from the 0-bit to 7-bit positions. Here, the forward direction of the tape means a direction heading from the left to the right when the tape is positioned under the head in FIG. 3.

Figure 4:
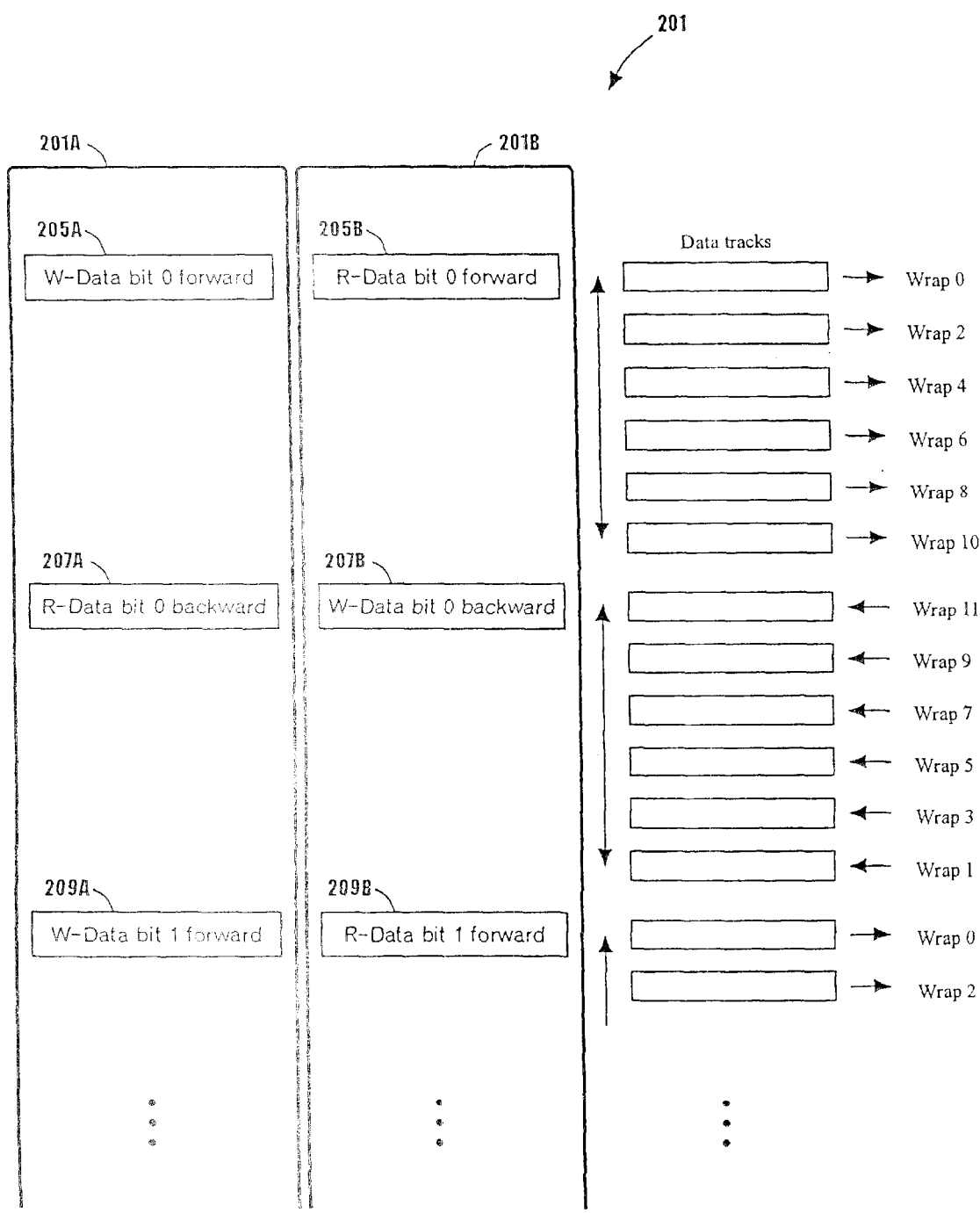
FIG. 4 a diagram showing partial details of the wraps.

FIG. 4 schematically shows a part of the magnetic head 201 and a part of the wraps corresponding thereto defined on a data band 0 on the tape. The conversion elements 205A and 205B are positioned for 0 bit at the wrap 0 and the conversion elements 207A and 207B are positioned likewise for 0 bit at the wrap 11, and the conversion elements 209A and 209B are positioned for 1 bit at the wrap 0. A person with ordinary skill in the art may easily surmise, by seeing FIGS. 3 and 4, how every conversion element included in the magnetic head 201 is positioned to each bit against the wraps on the data band.

As it can be easily inferred from this diagram, positioning of the magnetic head at the wrap 0 means that the conversion elements 205, 209, 213 . . . 225 only for use with the forward wraps correspond to each of the positions of the 8 bits all belonging to the wrap 0, and at the same time, the conversion elements 207, 211, 215 . . . 227 only for use with the backward wraps correspond to each of the positions of the 8 bits all belonging to the wrap 11. It can be understood likewise in the case where the magnetic head is positioned at another wrap. For instance, in the case of accessing the wrap 2, it can be understood, by moving the head just by one wrap, that the forward conversion elements are positioned at the 8 bits of the wrap 2 and the backward conversion elements are positioned at the 8 bits of the wrap 9.

Next, based on FIG. 4, action of the conversion elements and movement of the magnetic head when the magnetic head 201 accesses the wraps on a tape 100 are described. Now, the magnetic head 201 in FIG. 4 is positioned at the wrap 0 on the data band 0 (FIG. 2). When the magnetic tape moves in the forward direction in the writing mode, the forward conversion elements for writing 205A, 209A, 213A . . . 225A operate to write 8 bits of data at once. The conversion elements 205B, 209B, 213B . . . 225B for reading only read written data simultaneously to compare. Unlike the case of verifying the hardware that reads data written to the tape once to perform communication with a host computer in the read/write test described in detail later, only the hardware near the magnetic head checks it.

While writing data in the forward direction, the conversion elements only for backward wraps do not operate. When reading the data written to the wrap 0, the conversion elements for writing only do not operate but just the conversion elements for reading only operate. Next, when writing to the wrap 11, the tape is moved in the backward direction and the conversion elements 207B, 211B, 215B . . . 227B for writing only operate, and the conversion elements 207A, 211A, 215A . . . 227A for reading only compare written data with reading data as in the case of the forward direction. At this time, the conversion elements only for the forward wraps do not operate.

The wrap 0 and the wrap 11 are the data tracks wherein the magnetic head is at the same position in the tape width direction, and are distinguished just by the movement direction of the tape, and in the case of changing the wraps to be accessed between the two, it is sufficient to change the movement direction of the tape to switch the conversion elements to operate, and it is not necessary to move the magnetic head. To access the wrap 2, the magnetic head 201 is moved just by one wrap in the width direction of the magnetic tape based on the servo information. As for the wraps from 0 to 11, the magnetic head position and the conversion elements to be operated are controlled according to the servo information of the servo band 2 and a servo band 3 and the movement direction of the tape.

In addition, in the case of accessing the wraps included in another data band, the magnetic head 201 is moved between the data bands and the magnetic head position and the conversion elements to be operated are controlled likewise according to the corresponding servo information and the movement direction of the tape.

Figure 5:
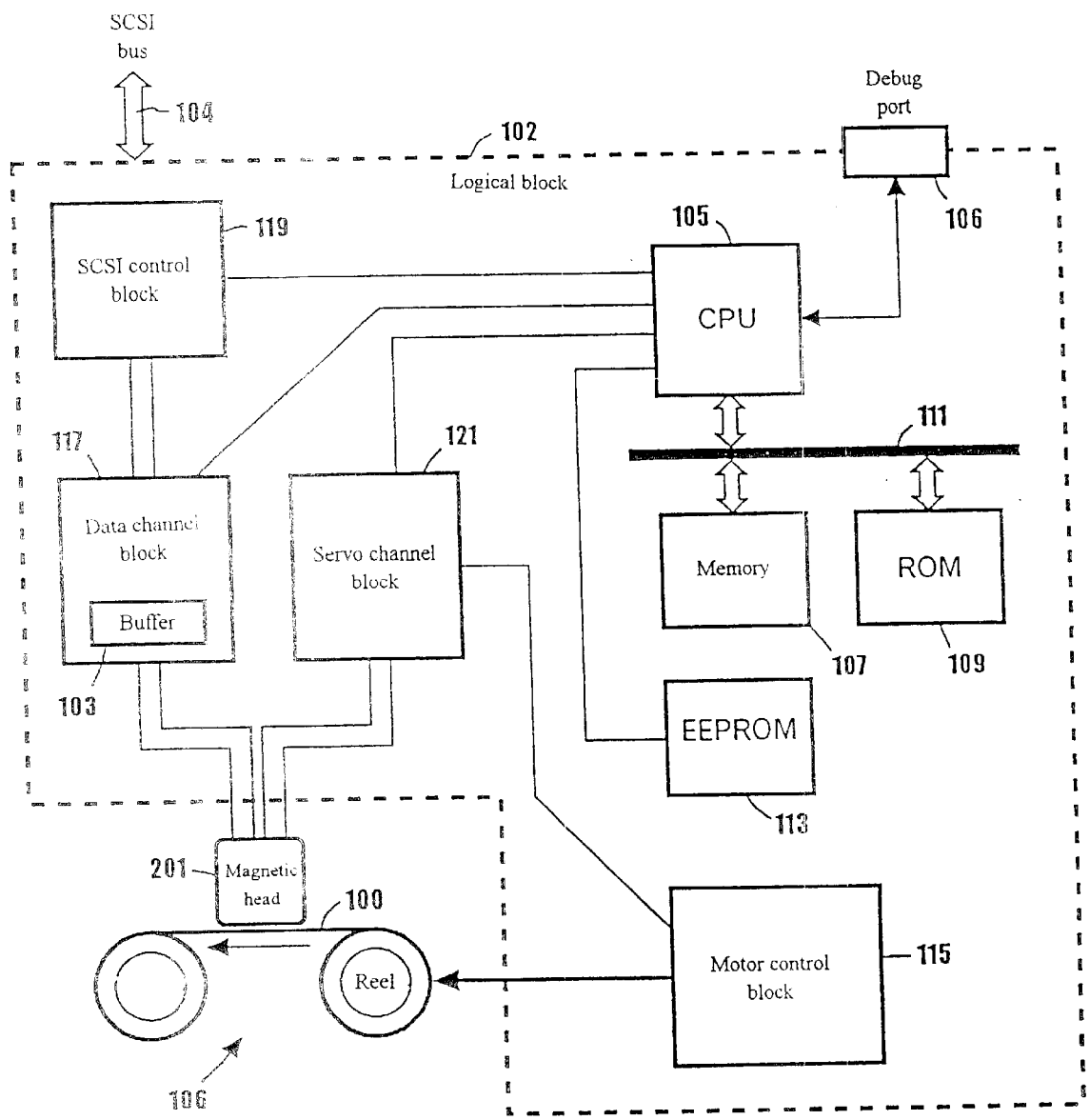
FIG. 5 is a partial block diagram of the magnetic tape drive described as the embodiment of the present invention.

FIG. 5 is a partial block diagram of the magnetic tape drive described as an embodiment of the present invention. FIG. 5 mainly shows the portion related to the data and control signals and omits the other portions. A logical block 102 is comprised of logical cards on which various components for controlling the data handled by the drive and operation thereof are mounted. The logical block 102 is connected to a SCSI bus 104 to perform data communication with the host computer. In addition, the logical block 102 has a debug port 106 placed, which is used as an interface for connecting a test apparatus for the purpose of a test in a manufacturing stage and a trouble analysis in an active state.

A CPU 105 controls the entire magnetic tape drive, and also controls the components included in the logical block 102 for data transfer with the host computer (unillustrated). Moreover, in relation to the present invention, it generates writing test patterns for the read/write test and implements wrap sequences for the test. A ROM 109 stores a program for executing the read/write test described in the embodiment of the present invention. A memory 107 is a RAM for temporarily storing a program to be executed by the CPU 105, where the program is transferred from the ROM 109 via a bus 111. Furthermore, the drive has a tape cartridge 106 placed, wherein the reeled tape moves forward and backward to be accessed by the magnetic head. An EEPROM 113 stores identifying information of the drive and configuration information of the system.

A SCSI control block 119 controls operation for performing communication between the logical block 102 and the host computer by using the SCSI bus. In addition, it checks the test patterns read from the magnetic tape in this embodiment, and notifies the host computer by way of the SCSI bus in case it finds an abnormality. A data channel block is connected to the SCSI control block and the magnetic head 201, and performs control for sending the data sent from the host to the magnetic head 201 and writing it to the magnetic tape 100, control for sending the data read by the magnetic head 201 to the SCSI control block, and detection and correction of data errors and so on. In addition, as illustrated in FIG. 3, it also has a function of, upon writing performed by the conversion element 205A, having the conversion element 205B read and check the contents.

The data channel block further includes a buffer 103 for adjusting timing of accessing the magnetic tape and data transfer to the SCSI control block. A servo channel block 121 is connected to the magnetic head 201, reads the servo information of the magnetic tape, generates control signals and controls operation of a motor for rotating the magnetic head 201 and the tape cartridge 106. A motor control block 115 actually controls operation of the motor based on the signals received from the servo channel block 121.

Figure 6:
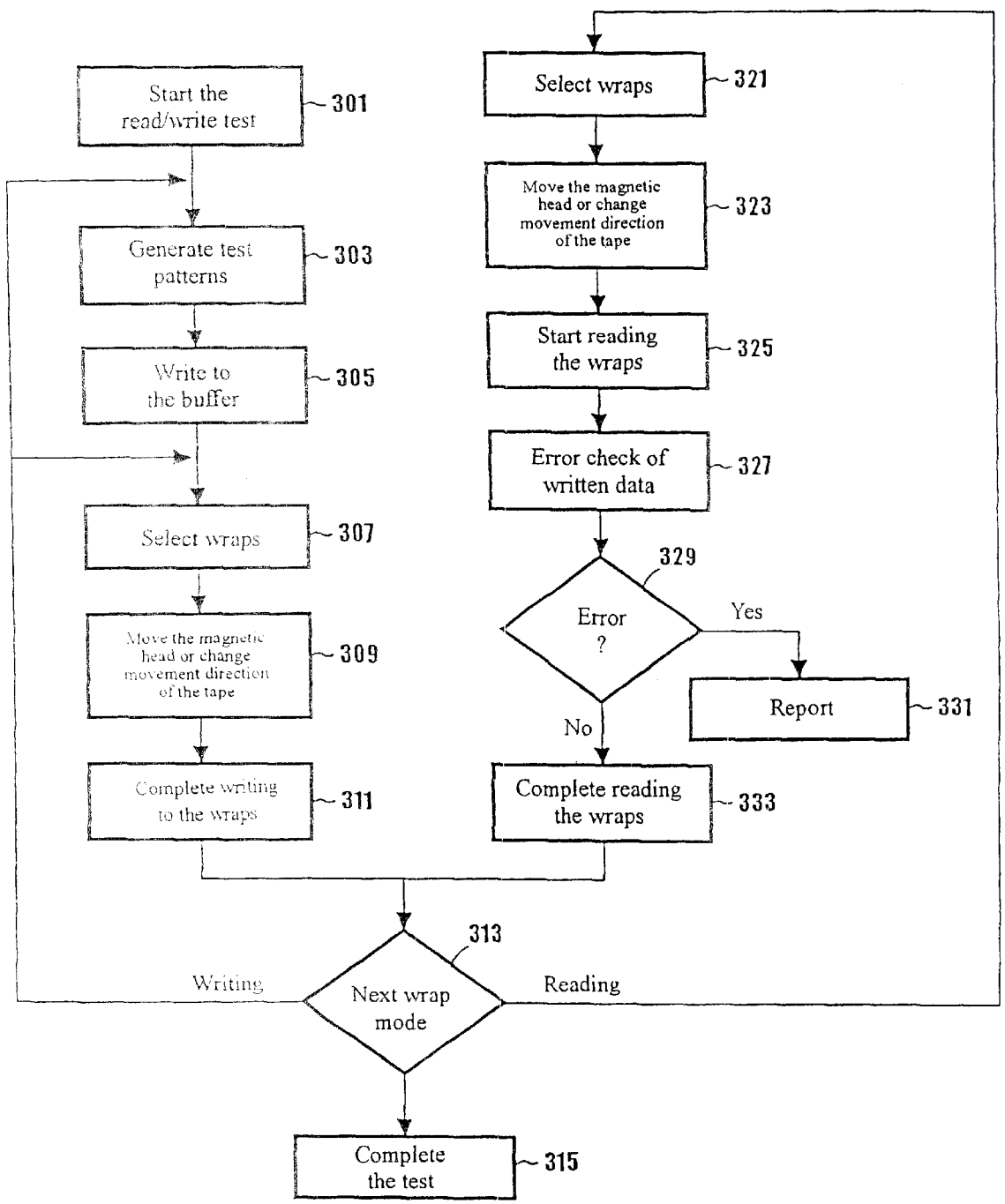
FIG. 6 is a flowchart showing the basic procedure of the read/write test.

Next, basic procedure of the read/write test will be described. FIG. 6 is a flowchart showing the basic procedure of the read/write test. The test is started at a block 301, and the CPU generates predetermined test patterns at a block 303, and then writes the patterns to the buffer 103 at a block 305. The test patterns in this embodiment comprise 32 MB, and the same patterns of 32 MB are sent consecutively to the magnetic head 201 from the buffer, so that each of the patterns has the same consecutive patterns written along a test length.

Next, at a block 307, the CPU 105 selects the wraps for writing the test patterns according to the procedure predetermined by the program, and at a block 309, it further sets the magnetic head position and the movement direction of the tape to correspond to the wraps, and sends the test patterns stored in the buffer to the magnetic head to write them to the selected wraps of the magnetic tape (block 311). In this embodiment, the test length for the overall tape length is set at 1.5 percent so that the test patterns can be written to each of the wraps to fill the test length.

If the writing to the wraps is completed, a mode of the next wraps is selected at a block 313 in accordance with a predetermined procedure. If the writing mode also applies to the next wraps, it returns to the block 303 or the block 307. In the case of returning to the block 303, the immediately preceding test mode is the reading mode, and it is because the buffer 103 stores the data read immediately before and the test patterns need to be rewritten. On the other hand, in the case where the immediately preceding mode is the writing mode, the buffer contents remain unchanged and the test patterns already stored can be used so that it returns to the block 307.

In the case where it is prescribed that the test mode of the next wraps is the reading mode at the block 313, it moves on to a block 321 to select the wraps to be read. The procedure is prescribed so that these wraps are the ones to which the test patterns are already written. Next, at a block 323, the magnetic head position and the movement direction of the tape are determined to correspond to the wraps. It starts reading the test patterns written to the wraps at a block 325, and it detects whether or not there is an error in the written test patterns at a block 327. This error detection can be executed either hardware-wise at the SCSI control block in FIG. 5 or software-wise by the CPU 105.

As a result of the check, in the case where the written test patterns are correctly read without an error, it moves on to a block 333 to terminate reading of the wraps. In the case of an error, there must be an abnormality on the tape or the drive so that it moves on to the block 311 to report to the host computer by the SCSI control block or the CPU. Thus, the test patterns are written to every wrap by the predetermined procedure and it is verified that there is no error in the read patterns, and then it is terminated by concluding that the read/write test is successful (block 315).

Next, FIG. 6 describes test time spent on the read/write test. First, the time spent for writing the test patterns to the buffer at the blocks 303 and 305 is 4.08 seconds. Therefore, if test wrap sequences that alternately switch reading and writing modes every time the wraps are changed are adopted, the test time of 4.08 seconds is spent every time it is changed from reading to writing.

Figures 7, 8:
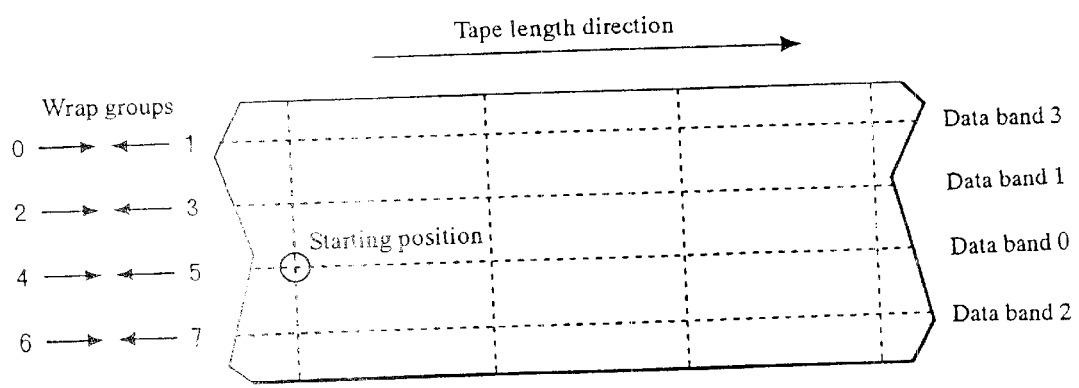
FIG. 7 is a diagram showing relationship between the time required for movement of the head for switching the wraps and switching patterns.
FIG. 8 is a diagram showing wrap groups of the magnetic tape used in the embodiment of the present invention.

In addition, another factor responsible for the test time is the time spent for movement of the magnetic head or change of the movement direction of the tape at the blocks 309 and 323. FIG. 7 is a table of measured values showing relationship between the time required for switching the wraps and switching patterns. FIG. 7 shows that, in the case of changing the wraps in the same data band, it requires 1.79 seconds to make the tape move in the same direction before and after the change of the wraps, and it requires 3.69 seconds to make it move in the reverse direction. To move from one data band to a adjacent data band, it requires 4.38 seconds when moving in the same direction, and it requires 3.69 seconds when moving in the reverse direction if the number of the moving wraps is 5 or less, and 6.24 seconds if 6 or more.

Furthermore, the time required for moving from one data band to a third data band therefrom is 6.95 seconds in the case of the wraps in the same direction, and it is 6.24 seconds in the case of the wraps in the reverse direction. The time required for moving to a fourth data band is 9.53 seconds in the case of the wraps in the same direction, and it is 8.84 seconds in the case of the wraps in the reverse direction. In the case of reviewing the measurement results in FIG. 7, it is necessary to take the characteristics of movement of the magnetic tape and the magnetic head into consideration.

To be more specific, when moving the magnetic head in a certain wrap position to another wrap position, it is necessary, in order to know the tape position and the head position, to always move the tape so that the servo information is read by the magnetic head. It is prescribed, as to the position of the tape in the length direction, that the magnetic tape of this embodiment has an ending position of the test length portion of the wraps before switching coinciding with a starting position of the test length portion of the wraps after switching. Thus, the magnetic tape is moving while moving the magnetic head, and to be more specific, it means that the starting position of the test length portion has already passed the magnetic head position when, on switching to the forward wraps, the magnetic head reaches the changed wrap position.

In this case, after the magnetic head is properly positioned to the changed wraps, the tape is moved in the backward direction so that the starting position of the test length portion properly coincides with the head position. In the case of moving to wraps on a different data band, every time the head reads data of any servo band, the starting position of the destination wraps of the head is compared with the current head position, and the movement direction of the tape is changed from the backward direction to the forward direction so that, after the head is positioned to predetermined wraps, the starting position of the test length portion coincides therewith. Because such relative relationship with the tape movement time is a factor in that the head movement time changes according to the number of the wraps and the number of the data bands to move to in FIG. 7, it should be noted that there may be the cases where, on moving on to the backward wraps on a adjacent data band for instance, the movement time is extremely different, which is bordered with one wrap.

Here, while the read/write test was conventionally conducted by writing the test patterns to the test length portion of every wrap in order of the wrap sequences in an actual active state as shown in FIG. 2 and reading them in the same order, the inventor decided to seek existence of new test wrap sequences that can reduce the test time. First, it was reviewed on the precondition that the time for writing to the tape is equal for all the wraps if writing length is the same, which also applies to the time for reading.

As the read/write test can be implemented by writing the test patterns to every wrap only along predetermined test length and further reading them to check the read patterns, the time for actually writing and reading the test patterns is the same among all the wrap sequences no matter what wrap sequences are adopted for the test, and so it is not included in calculation of time for comparing superiority or inferiority of the wrap sequences.

As the magnetic tape of this embodiment includes 48 wraps as shown in FIG. 2, optimum test wrap sequences should be acquired by applying the time required for switching the wraps shown in FIG. 7 to combinations of (48×2) ! pieces. It is difficult to implement it in reality, however, since the number of combination pieces is enormous and calculation requires considerable time even if a computer is used.

In particular, it is necessary to find test wrap sequences by an easier method as to computer-related products of which product cycles are short and reduced lead time is required.

First, when changing the wraps in the same data band in FIG. 7, the switching time is 1.79 seconds if switched to be in the same tape direction, and it is 3.69 seconds if switched to be in the reverse tape direction. Therefore, the wraps are switched so that the tape movement direction does not change when conducting the read/write test on the wraps included in the same data band.

For instance, as for the data band 0 in FIG. 2, the test time can be reduced by consecutively performing writing or reading to the forward wraps 0, 2, 4, 6, 8 and 10 in order or to the backward wraps 11, 9, 7, 5, 3 and 1 likewise. At this time, the order of reading and writing does not matter among the forward wraps or the backward wraps respectively. For instance, the test time is the same for the forward wraps whether the order is 0→2→4→6→8→10 or 6→2→8→10→4.

As it becomes clear that the wrap sequences in the same data band could have the shortest test time by selecting the wraps without changing the movement direction of the tape partway, this condition can be utilized to decrease combination requirements for finding the optimum wrap sequences. FIG. 8 is a diagram for reviewing the order of switching the wrap sequences among the data bands (hereafter, referred to as wrap group sequences) by excluding the wrap sequences in the same data band from the review so as to find the test wrap sequences.

The numbers from 0 to 7 on the left side are the numbers of the wrap groups including all the wraps in the same direction in the data band, and the arrows indicate the movement direction of the tape. For instance, a wrap group 4 is comprised of the wraps 0, 2, 4, 6, 8 and 10 included in the data band 0 indicating that these wraps are consecutively written or read irrespective of the order, and a wrap group 7 is comprised of the wraps 35, 33, 31, 29, 27 and 25 included in the data band 2 indicating that these wraps are consecutively written or read irrespective of the order.

In this embodiment, the read/write test is started from the wrap 0 included in the wrap group 4 on the data band 0 like in the actual active state. The first portion of the wrap 0 stores information on a tape format called FID (Format Identification Data Set) and the drive. However, it is evident that the range of the present invention does not need to start with the wrap 0 seeing that it is sufficient to maintain the movement direction of the tape whichever wrap it starts from in the same tape band mentioned earlier. As there are eight wrap groups and besides, two modes of reading and writing in FIG. 8, there are combinations of (8×2) ! pieces of the wrap group sequences.

Furthermore, the following three conditions are applied to these combinations so as to decrease the number of combinations.
(1) As for arbitrary wraps or wrap groups, they can be read only after writing the test patterns.
(2) Writing of the test patterns starts from an end of the tape, provided that, thereafter, it can move to any wrap group in the forward or backward direction from the position where reading or writing to the wrap groups on the data band is completed.
(3) A wrap group including the same wraps as the wrap sequences in the actual active state is selected as the wrap group for starting writing first, where the wrap group 4 is selected and the wrap 0 is further set up in this embodiment.

Consequently, the combinations of the wrap group sequences are 12,120,192 pieces. These numbers of the combinations is within the range of easy calculation by using a computer. In order to extract what can implement the shortest test time out of these wrap group sequences, the time required for switching the wraps in implementing each sequence is calculated as follows.

Now, the wrap groups in the writing mode is:
$W = \{w_k | k=0, 1, 2, \ldots 7\}$
The wrap groups in the reading mode is:
$R = \{r_k | k=0, 1, 2, \ldots 7\}$
The wrap group selected for writing first (4 is selected in this embodiment) is:
$P = \{p_k | k=0, 1, 2, \ldots 7\}$
The writing time to the buffer (a constant of 4.08 seconds in this embodiment) is:
$t_b$
The time required for switching from the wrap group m to the wrap group n, that is, the time required for changing the data bands is:
$T(p_m, p_n)$ To select optimum wrap sequences, it is sufficient just to mutually compare the time required for switching the wrap groups and the time for writing to the buffer since it is thinkable excluding the time required for switching the wraps in the same data band and the time for actual writing or reading. The time for switching the wrap groups T on selecting switching sequences of certain wrap groups can be calculated as follows. $T(p_4, w_0, w_1, r_0, r_1, w_2, w_3, r_2, r_3, w_4, w_5, r_4, r_5, w_6, w_7, r_6, r_7) = t_b + t(p_4, p_0) + t(p_0, p_1) + t(p_1, p_0) + t(p_0, p_1) + t(p_1, p_2) + t_b + t(p_2, p_3) + t(p_3, p_2) + t(p_2, p_3) + t(p_3, p_4) + t_b + t(p_4, p_5) + t(p_5, p_4) + t(p_4, p_5) + t(p_5, p_6) + t_b + t(p_6, p_7) + t(p_7, p_6) + t(p_6, p_7)$.

As for the illustration of the wrap group sequence shown in the above expression, if described by referring to FIG. 8, the test patterns are written to the buffer first, and the magnetic head is positioned at the wrap 0 of the wrap group 4 included in the data band 0 to read the FID and moves on to the data band 3 to write the test patterns to the wrap group 0 and then to the wrap group 1 on the same data band. When switching from the wrap group to the wrap group 1, the magnetic head position is not changed but only the movement direction of the tape is changed. While the wrap group 0 includes the wraps 36, 38, 40, 42, 44 and 46, the test patterns are written to all these wraps in the writing mode of the wrap group 0.

Next, the test patterns of the wrap group 0 are read, and then the test patterns of the wrap group 1 are read. Subsequently, the magnetic head is moved for writing to the wrap group 2 included in the data band 1. Furthermore, as the wrap group 0 and the wrap group 1 are read immediately before so that the buffer contents are rewritten with the read data, the test patterns are written to the buffer again. Likewise, a total of writing time, reading time and writing time to the buffer in required timing is calculated hereafter.

After reducing the number of the combinations by applying the above three conditions to all of the combinations of 12,120,192 pieces, a combination having the smallest total of the time for switching the wrap groups and the time for writing to the buffer was sought by applying the movement time of the head among the wraps and the writing time to the buffer in FIG. 7, so that the same time of 204.42 seconds was acquired in the wrap group sequences of 24 pieces shown in FIG. 9. This is an improvement compared with the 376.87 seconds required in the case of conventionally conducting the read/write test by applying the wrap sequences in the actual active state. Moreover, in applying the movement time of the head in FIG. 7, the data in the same data band is ignored, the wrap movement distance is selected to be 5 or less in the case of moving to the adjacent data band, and besides, the data shown in the diagram is selected as to the third and fourth data bands.

FIG. 9 shows that the wrap group 4 in FIG. 8 is set as the first object of writing in all the patterns of the 24 pieces, and to the wrap group sequence of No. 1, writing is performed first in order of 4→3→0→1→2→5→6→7 and reading is performed subsequently in order of 4→3→0→1→2→5→6→7. It is understood by seeing FIG. 9 that writing is performed first and reading is performed subsequently to all the wrap groups in all the wrap group sequences of 24 pieces. Writing to the buffer once is sufficient as to these sequences. Next, the wrap group sequence of No. 18 is arbitrarily selected from these wrap group sequences of 24 pieces.

Furthermore, wrap sequences comprised of 48 wraps are created based on the wrap group sequence of No. 18. The wrap group sequence of No. 18 moves to the adjacent data band whenever the magnetic head moves among data bands. When moving to the adjacent data band in the case of creating the wrap sequences, a selection is made so that the number of moving wraps is five or less and the conditions required for calculating the wrap group sequences of 24 pieces are met.

FIG. 10 shows the finally selected wrap sequences. FIG. 10 shows that the writing mode and subsequently the reading mode are implemented to the wrap groups in order of No. 1 through No. 16 and the order of the wraps in which the writing or reading mode is implemented as to the respective wrap groups. For instance, the writing mode is implemented to the wrap group 4 of No. 1 in order of the wraps 0→2→4→6→8→10, followed by the writing mode to the wrap group 2 of No. 2 in order of the wraps 35→33→31→29→27→25, and changed to the reading mode at No. 9, and finally the reading mode is implemented to the wrap group 7 of No. 16 in order of the wraps 35→33→31→29→27→25.

The present invention could provide a method for conducting the read/write test on the magnetic tape drive in a short time. In addition, the present invention could provide the magnetic tape drive capable of reducing the read/write test time.

I claim:

1. A test method for conducting a read/write test on a magnetic tape by moving a magnetic head in a magnetic tape drive, comprising the steps of:

providing a magnetic tape on which a plurality of data bands including a plurality of wraps respectively are allocated;

defining on said magnetic tape a test length shorter than its overall length;

setting order of writing test patterns on all of said plurality of wraps in the test length portion of said magnetic tape;

setting order of reading all the test patterns written on said plurality of wraps; and verifying said test patterns read out from said plurality of wraps, wherein said step of setting order of writing and said step of setting order of reading are set so as to move said magnetic head in different order from order of wraps in which said magnetic tape drive reads and writes data in a normal operation.

2. A test method for conducting a read/write test on a magnetic tape by moving a magnetic head in a magnetic tape drive, comprising the steps of:

providing a magnetic tape on which a plurality of data bands including both a forward wrap group having a plurality of forward wraps and a backward wrap group having a plurality of backward wraps respectively are allocated;

defining on said magnetic tape a test length shorter than its overall length;

setting accessing order to said data bands by said magnetic head, wherein said accessing order is not entirely dependent on an order of wraps in which said magnetic tape drive reads and writes data in a normal operation;

writing test patterns consecutively, in said test length portion, on all the wraps included in either the forward wrap group or the backward wrap group included in the data band selected according to the accessing order to said data bands;

reading said test patterns consecutively on all the wraps included in either the forward wrap group or the backward wrap group included in the data band selected according to the accessing order to said data bands; and verifying said test patterns read out from each of the wraps.

3. The test method according to claim 2, wherein said step of writing consecutively writes the test patterns on all the wraps included in either the forward wrap group or the backward wrap group included in the data band selected according to the accessing order to the data bands, and repeats the same procedure in other data bands to write the test patterns on all the wraps included in the forward wrap group and the backward wrap group included in all the data bands.

4. A magnetic tape drive for use with a magnetic tape having a plurality of data bands including a plurality of wraps respectively, comprising:

a magnetic head;

a buffer for temporarily storing data to be transferred to said magnetic head or data to be transferred from said magnetic head;

a computer-readable storage device storing a program for executing steps of;

defining on said magnetic tape a test length shorter than its overall length, setting order of writing test patterns on all of said plurality of wraps in the test length portion of said magnetic tape, and setting order of reading all the test patterns written on said plurality of wraps, wherein said step of setting order of writing and said step of setting order of reading are set so as to move said magnetic head in different order from order of wraps in which said magnetic tape drive reads and writes data in a normal operation;

a central processing unit for executing said program; and a memory for temporarily storing said program in order to execute said program to execute said program in said central processing unit.

5. A magnetic tape drive for use with a magnetic tape having a plurality of data bands including both a forward wrap group having a plurality of wraps and a backward wrap group having a plurality of wraps respectively, comprising:

a magnetic head;

a buffer for temporarily storing data to be transferred to said magnetic head or data to be transferred from said magnetic head;

a computer-readable storage device storing a program for executing steps of;

defining on said magnetic tape a test length shorter than its overall length, setting accessing order to said data bands by said magnetic head, writing test patterns consecutively, in said test length portion, on all the wraps included in either the forward wrap group or the backward wrap group included in the data band selected according to the accessing order to said data bands, and reading said test patterns consecutively on all the wraps included in either the forward wrap group or the backward wrap group included in the data band selected according to the accessing order to said data bands, wherein said accessing order is not entirely dependent on an order of wraps in which said magnetic tape drive reads and writes data in a normal operation;

a central processing unit for executing said program; and a memory for temporarily storing said program in order to execute said program in said central processing unit.

6. The magnetic tape drive according to 5, wherein said magnetic tape drive has means for verifying said test patterns read out from the wraps.

7. The magnetic tape drive according to claim 4, wherein said magnetic tape drive has means for verifying said test patterns read out from the wraps.

\* \* \* \* \*

UNITED STATES PATENT AND TRADEMARK OFFICE
CERTIFICATE OF CORRECTION

PATENT NO. : 6,744,581 B2
DATED : June 1, 2004
INVENTOR(S) : Miyamura

Page 1 of 1

It is certified that error appears in the above-identified patent and that said Letters Patent is hereby corrected as shown below:

Column 12,
Line 53, change "selling" to -- setting --;

Column 14,
Line 9, after "according to" insert -- claim --.

Signed and Sealed this

Tenth Day of August, 2004

JON W. DUDAS
*Acting Director of the United States Patent and Trademark Office*